United States Patent [19]

Paice et al.

[11] Patent Number: 4,618,906
[45] Date of Patent: Oct. 21, 1986

[54] HYBRID SOLID STATE/MECHANICAL SWITCH WITH FAILURE PROTECTION

[75] Inventors: Derek A. Paice, Murrysville; Kenneth E. Mattern, Gibsonia, both of Pa.

[73] Assignee: Westinghouse Electric Corp., Pittsburgh, Pa.

[21] Appl. No.: 631,357

[22] Filed: Jul. 16, 1984

[51] Int. Cl.[4] .............................................. H02H 3/087
[52] U.S. Cl. ............................................... 361/5; 361/8; 361/57; 361/93; 361/104
[58] Field of Search ........................ 361/2, 3, 5, 8, 93, 361/98, 101, 104, 54, 57

[56] References Cited

U.S. PATENT DOCUMENTS

| | | | |
|---|---|---|---|
| 3,277,460 | 10/1966 | Heckman | 361/57 |
| 3,579,036 | 5/1971 | McCoy | 361/57 |
| 4,025,820 | 5/1977 | Penrod | 361/8 |
| 4,249,223 | 2/1981 | Shuey et al. | 361/4 |
| 4,251,845 | 2/1981 | Hancock | 361/8 |
| 4,420,784 | 12/1983 | Chen et al. | 361/7 |
| 4,466,038 | 8/1984 | Robertson | 361/8 |

Primary Examiner—A. D. Pellinen
Assistant Examiner—A. Jonathan Wysocki
Attorney, Agent, or Firm—R. P. Lenart

[57] ABSTRACT

A hybrid solid state/mechanical switch is provided with a pair of mechanical contacts connected in parallel with a solid state switching device. These components are operated by a control circuit to achieve arcless current interruption under normal conditions. A circuit breaking device, which can be operated by a crowbar circuit, provides failure protection for the hybrid switch if excessive leakage current is detected in the solid state switching device or current continues to flow through the switch at a preselected time following the occurrence of a turn-off command signal.

8 Claims, 4 Drawing Figures

HYBRID SOLID STATE/MECHANICAL SWITCH WITH FAILURE PROTECTION

BACKGROUND OF THE INVENTION

This invention relates to electrical switching devices and more particularly to switches which include both mechanical contacts and solid state switching devices connected to achieve arcless current interruption.

Certain switching applications such as the control of DC power in an aircraft electrical power system, require the use of DC contactors which are capable of providing arcless current interruption and low power dissipation. Although it is possible to avoid arcing by making DC contactors which utilize solid state switching components, such contactors are considered feasible only at modest current levels, such as less than about 50 amperes. When higher steady state currents are encountered, the power dissipation and heating in the solid state components becomes unacceptable. On the other hand, electromechanical relays offer the advantage of providing high current handling capacity with low power dissipation. Therefore, it is advantageous to combine mechanical contacts and solid state switching elements to achieve arc-less current interruption and low steady state power dissipation.

Critical applications such as aircraft electrical systems also require switching devices which include failure protection capability. This includes the detection of a failed switch component with subsequent disabling of the switching device.

SUMMARY OF THE INVENTION

The present invention provides a DC line contactor in which a pair of low voltage mechanical contacts are used to carry load currents and a solid state bypass device such as a transistor or gate turn-off thyristor is used to handle switching transients. The solid state bypass device is connected in parallel with the mechanical contacts and is gated on shortly before the mechanical contacts close and gated off shortly after the mechanical contacts open to provide arcless switch operation.

A hybrid electrical switch constructed in accordance with the present invention comprises: a pair of terminals for connection to a power line; a branch circuit connected between the power line terminals and including the series connection of a circuit breaking device and a pair of mechanical contacts; a solid state switching device electrically connected in parallel with the pair of mechanical contacts; a crowbar circuit connected between a reference terminal and a power connection in the branch circuit located between the circuit breaking device and the mechanical contacts; means for controlling the operation of the mechanical contacts and the solid state switching device such that the solid state switching device is turned on before closure of the mechanical contacts and is turned off after the mechanical contacts open; means for triggering the crowbar circuit when leakage current through the solid state switching device exceeds a preselected magnitude; and means for triggering the crowbar circuit when current flows through the circuit breaking device for a period which exceeds a predetermined duration following the expected opening time of the mechanical contacts.

In an alternative embodiment, the circuit breaking device may be connected in series with the solid state switching device to form a branch circuit which is connected in parallel with the pair of mechanical contacts. That embodiment would be used in an application where the mechanical contacts would be required to operate under a failure condition, with arcing across the contacts.

DESCRIPTION OF THE PREFERRED EMBODIMENTS

Figure 1:
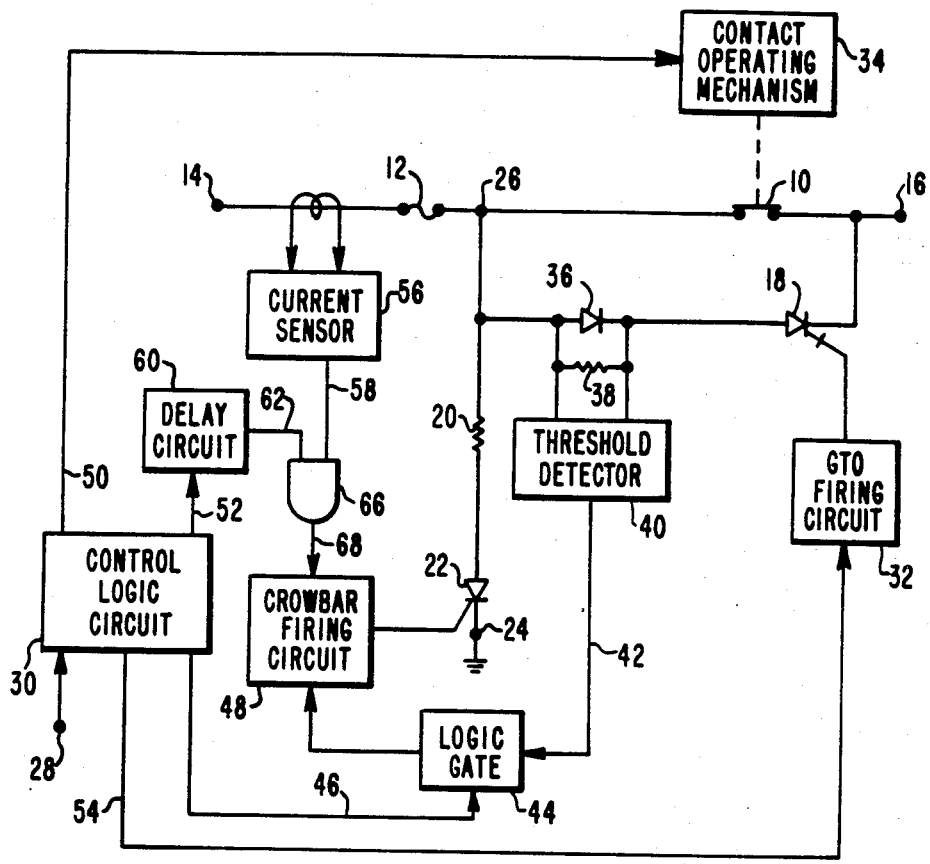
FIG. 1 is a schematic diagram of an electrical switching system constructed in accordance with one embodiment of the present invention.

Referring to the drawings, FIG. 1 is a schematic diagram of a switching system constructed in accordance with one embodiment of the present invention. In this embodiment, a pair of mechanical contacts 10 are connected in series with a circuit breaking device or fuse 12 to form a branch circuit which is connected between a pair of power line terminals 14 and 16. A solid state switching device such as a gate turn-off thyristor (GTO) 18 is connected in parallel with the pair of mechanical contacts 10. A crowbar circuit which in this embodiment includes the series connection of resistor 20 and thyristor 22, is connected between a reference terminal 24 and a connection point 26 in the main circuit branch which is located between the mechanical contacts and the circuit breaking device. Under normal operating conditions, a switch operating signal is placed on input terminal 28 causing control logic circuit 30 to initiate the switching sequence by initially providing a logic signal to GTO firing circuit 32 which subsequently provides a gate signal to turn on gate turn-off thyristor 18. Once gate turn-off thyristor 18 is conducting, control logic circuit 30 sends a logic signal to contact operating mechanism 34, which may be an electromechanical device, to close mechanical contacts 10. Because of the low voltage drop across the mechanical contacts, solid state switching device GTO 18 does not pass sufficient current to remain in the on state after the mechanical contacts have closed and therefore turns off.

Switch failure protection is provided by circuitry which detects leakage current in the solid state switching device and additional circuitry which detects a short circuit in the solid state switching device or a malfunction of the mechanical contacts. To detect leakage current in the solid state switching device, a diode 36 is placed in series with GTO 18 and a resistor 38 is connected in parallel with the diode. The voltage across this parallel circuit is then delivered to a threshold detector 40 which produces a logic output signal when the voltage across the parallel circuit exceeds a predetermined magnitude. This leakage current logic signal is delivered by line 42 to logic gate 44 which is used to prevent a false leakage current indication during turn-on and turn-off of the switch. This function is performed with the aid of an input signal on line 46 from the control logic circuit 30 which blocks the threshold detector output logic signal during turn-on and turn-off of the switch. At other times, when leakage current is detected, a logic signal is passed to crowbar firing circuit 48, thereby turning on thyristor 22 to cause current flow which is sufficient to blow the fuse 12.

A short circuit condition in the solid state switching device or a malfunction of the mechanical contacts is diagnosed by measuring the fuse current and corrected by applying a logic turn-off command signal from control logic circuit 30. The turn-off command signal is produced on line 50, 52 and 54 to initiate the turn-off sequence. During the turn-off sequence, current sensor 56 monitors the fuse current and produces a logic output signal on line 58. Delay circuit 60 inhibits the turn-off signal on line 52 for a predetermined time interval which is of sufficient duration to exceed the expected opening time of the mechanical contacts in the normal turn-off sequence. After this time interval, the turn-off logic signal is delivered to line 62. If current is still flowing at this point, the logic signals on lines 58 and 62 will produce a short circuit indicating signal on output line 68 of AND gate 66, thereby causing crowbar firing circuit 48 to trigger thyristor 22 and blow the fuse 12.

Figure 2:
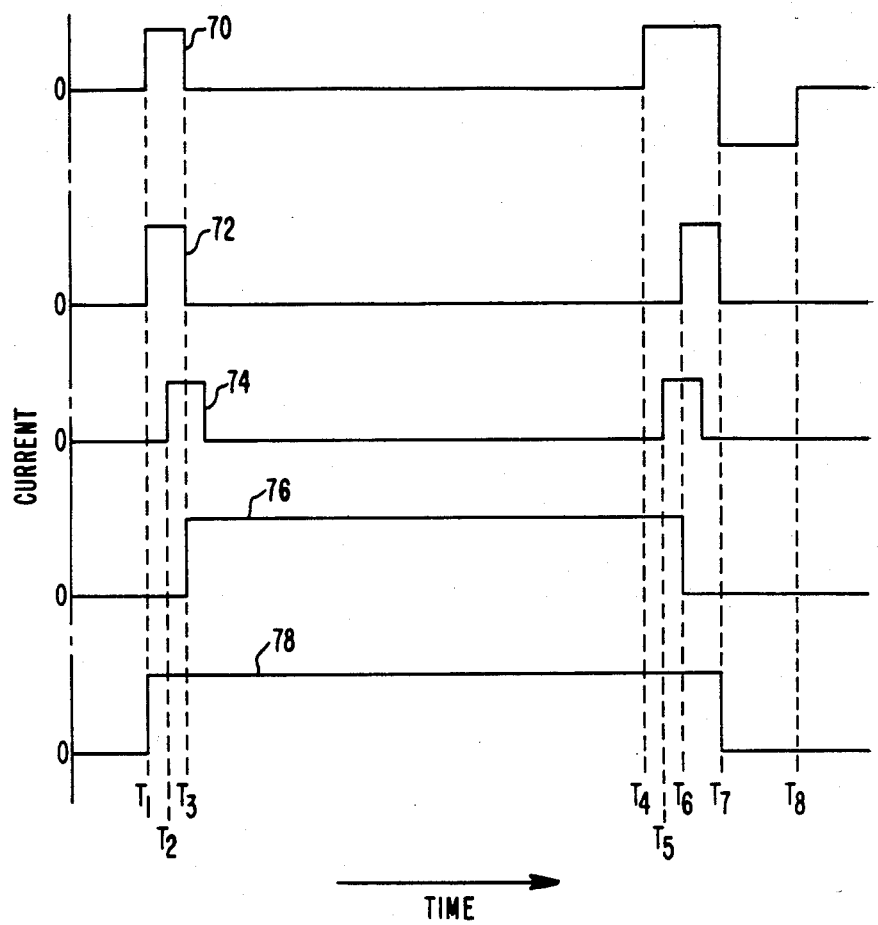
FIG. 2 is a series of waveforms illustrating the operation of the switching system of FIG. 1.

FIG. 2 is a series of waveforms which illustrate the operation of the circuit of FIG. 1. In FIG. 2, waveform 70 represents the gate current in solid state switching device 18, waveform 72 represents current in the main conduction path of solid state switching device 18, waveform 74 represents a command signal delivered by control logic circuit to contact operating mechanism 34, waveform 76 represents the current through mechanical contacts 10, and waveform 78 represents the total current through the hybrid switch. At time $T_1$, GTO firing circuit 32 delivers a gate pulse to GTO 18 thereby causing conduction through its main current conducting path. Once the solid state switching device is conducting current, a command signal is delivered to the contact operating mechanism 34 at time $T_2$. At time $T_3$, current begins to flow through the mechanical contacts. Because of the low voltage drop of the mechanical contacts, current stops flowing through GTO 18. To turn off the hybrid switch, at time $T_4$, gate current is again applied to GTO 18 and at a later time $T_5$, a contact opening command signal is provided to contact operating mechanism 34. At time $T_6$, the mechanical contacts open and current is shunted through GTO 18. At time $T_7$, a turn-off gate signal is applied to GTO 18. From the waveforms of FIG. 2, it is clear that current flows through GTO 18 under normal conditions between times $T_1$ and $T_3$ and between times $T_6$ and $T_7$. Therefore, for these time intervals, logic gate 44 blocks the output of threshold detector 40. At all other times, any output from threshold detector 40 will trigger crowbar firing circuit 48 thereby blowing fuse 12. To operate the short circuit protecton circuitry, delay circuit 60 inhibits a logic turn-off signal from passing to line 62 for the time period between times $T_5$ and $T_8$. At time $T_8$, the signal would appear on line 62. If at this time, current sensor 56 indicates on line 58 that current continues to flow through the switch, crowbar firing circuit 48 would again be triggered to turn on thyristor 22.

Figure 3:
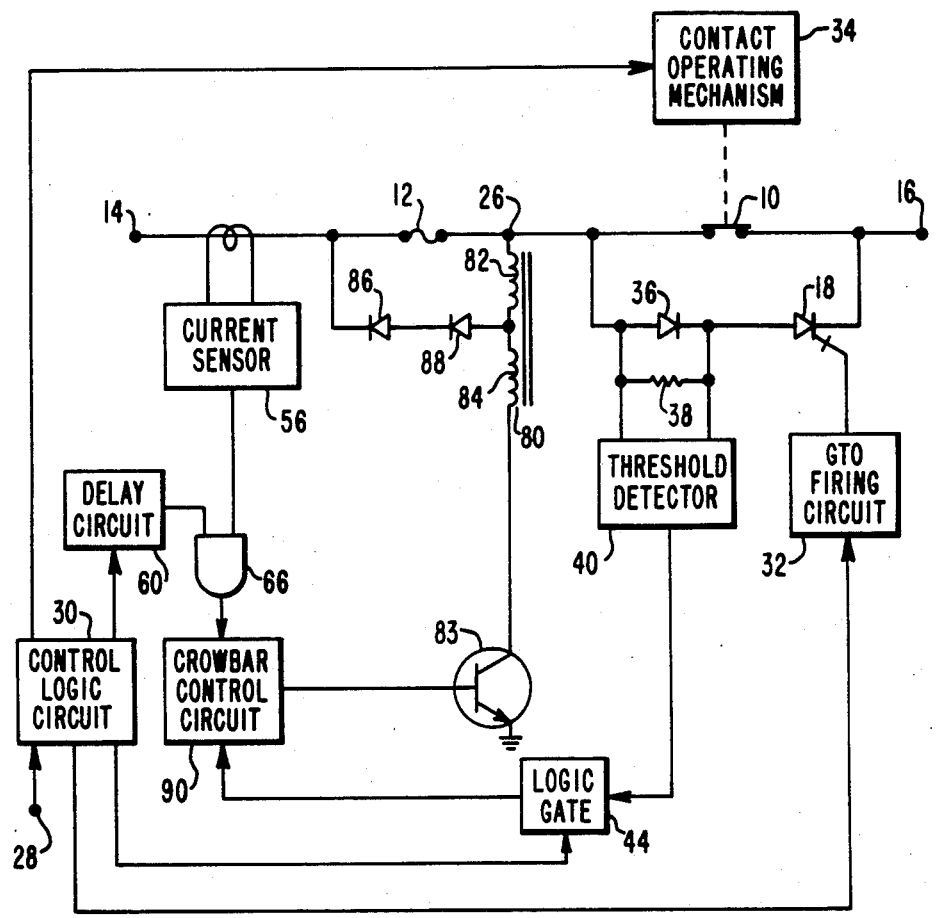
FIG. 3 is a schematic diagram of an alternative embodiment of the present invention.

FIG. 3 is a schematic diagram of an alternative embodiment of the present invention which includes a DC to DC step-down converter as a crowbar circuit to activate the fuse without drawing large current from he external power source. In this embodiment, an autotransformer 80 is connected in series with the main conduction path of a transistor switch 83 to form the crowbar circuit. The autotransformer 80 includes first and second series connected coils 82 and 84. Series connected diodes 86 and 88 are connected between one power line terminal and the connection point between the autotransformer coils such that coil 82 is connected in parallel with fuse 12. This arrangement enables a high current low voltage output to be applied through diodes 86 and 88 to melt fuse 12. If the number of turns in coil 84 is significantly greater than the number of turns in coil 82, current through transformer 80 need only be a small fraction of the melting current of the fuse. For example, for a DC power line voltage of 200 volts or greater, the turns ratio can be selected such that the power line need only apply approximately 1/50th of the fuse melting current. To actuate crowbar circuit operation, crowbar control circuit 90 receives inputs from either logic gate 44 or AND circuit 66 and outputs a pulse wave to repetitively turn transistor 83 on and off.

Figure 4:
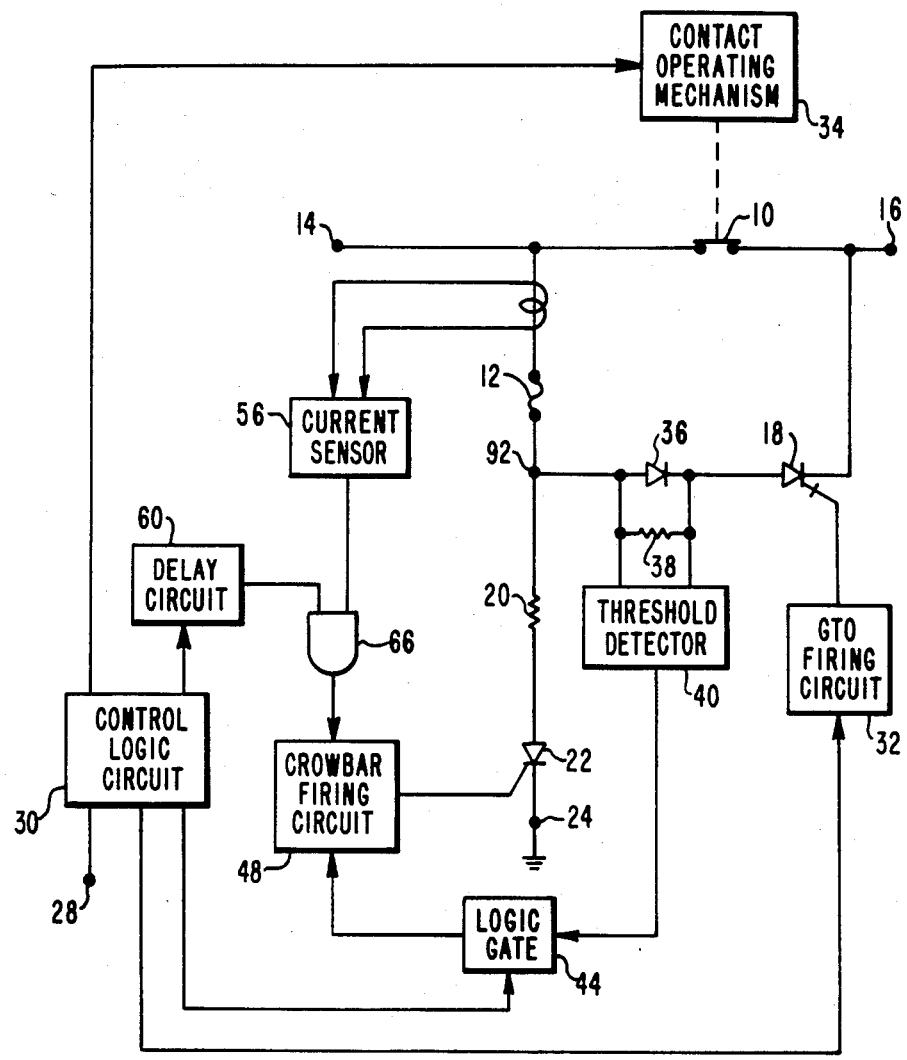
FIG. 4 is a schematic diagram of another alternative embodiment of the present invention.

Another embodiment of the present invention is shown in the schematic diagram of FIG. 4. In this circuit arrangement, fuse 12 is connected in series with the solid state switching device to form a branch circuit which is connected in parallel with the mechanical contacts 10. The crowbar circuit is connected between connection point 92 in the branch circuit and reference terminal 24. This circuit allows operation of the mechanical contacts even if a failure occurs in the solid state switch device circuit branch. However, arcing across the contacts will occur if the solid state switching device has been eliminated from the circuit because of a fault.

Using the circuits of FIGS. 1, 3 or 4, a hybrid solid state/mechanical switch may be designed in which leakge current of, for example, 2 milliamps can be detected in the solid state device and the mechanical contacts can pass a large current of, for example, 600 amps with a relatively small voltage drop of, for example, 5 volts. To achieve the desired leakage current failure protection operation, a 25 ohm resistor may be used as resistor 38 which is connected in parellel with a power diode 36. With this arrangement, a 2 milliamp leakage current would produce a 50 millivolt DC signal across the resistor/diode circuit and less than 0.2 milliamps would flow through the diode at temperatures of 95° C. The 50 millivolt DC voltage can be easily amplified to operate a leakage detector using a simple operational amplifier. This 50 millivolt DC voltage level can then be used as the threshold at which threshold detector 40 produces a leakage current output signal to subsequently fire the crowbar circuit. Current through the crowbar circuit then melts the fuse to provide failsafe operation of the hybrid switch.

Although the present invention has been described in terms of what are at present believed to be its preferred embodiments, it will be apparent to those skilled in the art that various changes may be made without departing from the scope of the invention. It is therefore intended that the appended claims cover all such changes.

What is claimed is:

1. A hybrid electrical switch comprising:
   a pair of terminals for connection to a power line;
   a branch circuit connected between said power line terminals, said branch circuit including the series connection of a circuit breaking device and a pair of mechanical contacts;
   a solid state switching device electrically connected in parallel with said pair of mechanical contacts;
   a crowbar circuit connected between a reference terminal and a connection point in said branch circuit located between said circuit breaking device and said pair of mechanical contacts;

means for controlling the operation of said pair of mechanical contacts and said solid state switching device such that said solid state switching device is turned on before the closure of said mechanical contacts and is turned off after said mechanical contacts open;

means for triggering said crowbar circuit when the leakage current through said solid state switching device exceeds a preselected magnitude; and means for triggering said crowbar circuit when current flows through said circuit breaking device for a period which exceeds a predetermined duration following the expected opening time of said pair of mechanical contacts.

2. A hybrid electrical switch as recited in claim 1, wherein said means for triggering said crowbar circuit when the leakage current through said solid state switching device exceeds a preselected magnitude comprises:

a diode connected in series with said solid state switching device;

a resistor connected in parallel with said diode; and a threshold detector for producing a crowbar circuit firing signal when the voltage across the parallel connection of said diode and said resistor exceeds a predetermined magnitude.

3. A hybrid electrical switch as recited in claim 1, wherein said means for triggering said crowbar circuit when current flows through said circuit breaking device for a period which exceeds a predetermined duration following the expected opening time of said mechanical contacts comprises:

means for producing a first logic signal when current is flowing through said circuit breaking device;

means for producing a second logic signal at a time equal to said predetermined duration following the expected opening time of said mechanical contacts; and means for producing a crowbar circuit firing signal when said first and secnd logic signals are each at a predetermined logic level simultaneously.

4. A hybrid electrical switch as recited in claim 1, wherein said crowbar circuit comprises:

an autotransformer including first and second series connected coils wherein one end of said first coil is connected to the connection point in said branch circuit and the other end of said first coil is connected to a diode such that a circuit branch formed by the series connection of said first coil and said diode is connected in parallel with said circuit breaking device;

a transistor switch connected in series with said series connected first and second coils; and means for turning said transistor on and off in response to a crowbar circuit firing signal.

5. A hybrid electrical switch as recited in claim 4, wherein the number of turns in said first coil is less than the number of turns in said second coil.

6. A hybrid electrical switch comprising:

a pair of terminals connected to a power line;

a pair of mechanical contacts connected between said power line terminals;

a branch circuit electrically connected in parallel with said pair of mechanical contacts, said branch circuit including the series connection of a circuit breaking device and a solid state switching device;

a crowbar circuit connected between a reference terminal and a connection point in said branch circuit located between said circuit breaking device and said solid state switching device;

means for controlling the operation of said pair o mechanical contacts and said solid state switching device such that said solid state switching device is turned on before the closure of said mechanical contacts and is turned off after said mechanical contacts open;

means for triggering said crowbar circuit when the leakage current through said solid state switching device exceeds a preselected magnitude; and means for triggering said crowbar circuit when current flows through said circuit breaking device for a period which exceeds a predetermined duration following the expected opening time of said pair of mechanical contacts.

7. A hybrid electrical switch as recited in claim 6, wherein said means for triggering said crowbar circuit when the leakage current through said solid state switching device exceeds a preselected magnitude comprises:

a diode connected in series with said solid state switching device;

a resistor connected in parallel with said diode; and a threshold detector for producing a crowbar circuit firing signal when the voltage across the parallel connection of said diode and said resistor exceeds a predetermined magnitude.

8. A hybrid electrical switch as recited in claim 6, wherein said means for triggering said crowbar circuit when current flows through said circuit breaking device for a period which exceeds a predetermined duration following the expected opening time of said mechaincal contacts comprises:

means for producing a first logic signal when current is flowing through said circuit breaking device;

means for producing a second logic signal at a time equal to said predetermined duration following the expected opening time of said mechanical contacts; and means for producing a crowbar circuit firing signal when said first and second logic signals are each at a predetermined logic level simultaneously.

* * * * *